2,818,455

DESORPTION OF STRAIGHT CHAIN HYDRO-CARBONS FROM SELECTIVE ADSORBENTS

Wiley P. Ballard and Samuel P. Dickens, Port Arthur, and Benjamin F. Smith, Groves, Tex., assignors to The Texas Company, New York, N. Y., a corporation of Delaware No Drawing. Application March 28, 1955
Serial No. 497,424

23 Claims. (Cl. 260—676)

This invention relates to the desorption of straight chain hydrocarbons from selective adsorbents containing the same. In accordance with one embodiment this invention relates to a hydrocarbon treating process involving in combination the adsorptive separation of straight chain hydrocarbons from a hydrocarbon fraction containing straight chain hydrocarbons and non-straight chain hydrocarbons, followed by desorption of the straight chain hydrocarbons from the selective adsorbent.

Selective adsorbents for the adsorptive separation of straight chain hydrocarbons are known, see Barrer U. S. 2,413,134. It has been proposed that the adsorbed straight chain hydrocarbons contained in a selective adsorbent for the same be desorbed by contacting the selective adsorbent with a gaseous material such as flue gas, carbon dioxide and steam. Various other normally gaseous materials have also been proposed to effect desorption of adsorbed straight chain hydrocarbons. In general, however, the materials proposed heretofore have not been entirely satisfactory. For example, in the case of steam it has been experienced that the adsorptive capacity of a selective adsorbent from which straight chain hydrocarbons have been desorbed by contact with steam is adversely affected with the result that after one or more desorption operations involving contact with steam the selective adsorbent exhibits a substantially reduced adsorptive capacity for straight chain hydrocarbons. It has been proposed that normally gaseous materials such as flue gas and carbon dioxide be substituted for steam as the desorbing medium. In general, however, these gases are not entirely satisfactory. For example, although a normally gaseous material such as carbon dioxide does not adversely affect the adsorptive capacity of a selective adsorbent for straight chain hydrocarbons it has been found that very great volumes of gaseous carbon dioxide must contact the selective adsorbent before substantially all of the straight chain hydrocarbons can be desorbed from the adsorbent. When large volumes of a normally gaseous desorbing fluid are employed the resulting desorbed straight chain hydrocarbons comprise only a very minor proportion of the resulting desorption effluent (desorbed straight chain hydrocarbons and desorbing fluid). When straight chain hydrocarbons comprise only a very minor proportion, for example, below about 10% by volume, more frequently below about 5% by volume of the total desorption effluent, the straight chain hydrocarbons are separated from the desorption effluent only with difficulty. Frequently in such an operation a substantial amount of the desorbed straight chain hydrocarbons are not recovered.

Furthermore, it is usually desirable to carry out the desorption operation at a relatively elevated temperature in order to effect a more rapid desorption of the adsorbed straight chain hydrocarbons. Accordingly it is advantageous to employ as the desorbing fluid a material which has a relatively high heat capacity or heat content per volume of desorbing fluid. Although steam, from the point of view of heat capacity, may be considered satisfactory it does possess the decided disadvantage in some instances, if not properly employed, of adversely affecting the adsorptive capacity of the selective adsorbent, as indicated hereinabove. The other normally gaseous desorbing fluids such as carbon dioxide and flue gas possess a relatively low heat capacity per unit volume or low molar heat capacity as compared to steam with the result that very large volumes of such gaseous desorbing fluids must be employed in order to bring the selective adsorbent up to the elevated temperature at which it is desired to carry out the desorption operation.

Accordingly it is an object of this invention to provide an improved method for effecting the desorption of straight chain hydrocarbons from a selective adsorbent containing the same.

Another object of this invention is to provide an improved desorption operation involving the desorption of straight chain hydrocarbons from selective adsorbents containing the same by contacting said adsorbent with a gaseous desorbing fluid which possesses a relatively high heat capacity per unit volume, or a relatively high molar heat capacity.

Still another object of this invention is to provide an improved desorption operation involving the desorption of straight chain hydrocarbons from a selective adsorbent containing the same by contacting said adsorbent with a gaseous fluid which possesses a substantially high heat capacity per unit volume but which at the same time does not adversely affect the adsorptive capacity of the selective adsorbent.

Another object of this invention is to provide an improved hydrocarbon treating process.

How these and other objects of this invention are accomplished will become apparent with reference to the accompanying disclosure. In at least one embodiment of this invention at least one of the foregoing objects will be achieved.

In accordance with our invention we have provided an improved method of desorbing straight chain hydrocarbons from a selective adsorbent which contains straight chain hydrocarbons adsorbed therein which comprises contacting said adsorbent with a gaseous desorbing fluid which possesses a relatively high heat capacity per unit volume or a relatively high molar heat capacity, which gaseous fluid at the same time does not adversely affect the adsorptive capacity of the selective adsorbent. More particularly, we have provided an improved method of desorbing straight chain hydrocarbons from a selective adsorbent containing straight chain hydrocarbons adsorbed therein which comprises contacting said adsorbent with a gaseous hydrocarbon containing at least 3 carbon atoms per molecule at an elevated temperature sufficiently high to effect desorption of the adsorbed straight chain hydrocarbons from said adsorbent. In the practice of our invention it is preferred to employ as said gaseous desorbing fluid a hydrocarbon which not only possesses a relatively high molar heat capacity or a relatively high heat capacity per unit volume (under constant volume $C_v$ or constant pressure $C_p$) but which also is a readily condensible or liquefiable hydrocarbon containing at least 3 carbon atoms per molecule, preferably a straight chain hydrocarbon.

By straight chain hydrocarbon is meant any aliphatic or acyclic or open chain hydrocarbon which does not possess side chain branching. Representative straight chain hydrocarbons are the normal paraffins and the normal olefins, mono- or polyolefins, including the straight chain acetylenic hydrocarbons. The non-straight chain hydrocarbons comprise the aromatic and naphthenic hydrocarbons as well as the isoparaffinic and isoolefinic hydrocarbons and the like.

Straight chain hydrocarbon-containing mixtures which are suitably treated for the separation of straight chain hydrocarbons therefrom, followed by desorption of the adsorbed straight chain hydrocarbons from the adsorbent include the various petroleum fractions such as a naphtha or gasoline fraction, a diesel oil fraction, a kerosene fraction, a gas oil fraction and the like. A typical hydrocarbon fraction which may be treated for the removal of hydrocarbons therefrom might have a boiling point or boiling range in the range 40–600° F. and higher and contain a substantial amount of straight chain hydrocarbons, e. g., 2–35% by volume and higher. More particularly, a hydrocarbon fraction to be treated and containing straight chain hydrocarbons might have an initial boiling point in the range 40–300° F. and an end point in the range of 150–600° F. and higher. A hydrocarbon fraction treated for the removal of straight chain hydrocarbons therefrom might have the following composition:

| Hydrocarbon type: | Percent by volume |
|---|---|
| Naphthenes | 0–75 |
| Aromatics | 0–50 |
| Acyclic saturates and unsaturates (including normal paraffins, isoparaffins, normal olefins and/or isoolefins) | 2–90 |

Typical refinery stocks or petroleum fractions which may be treated for the adsorptive separation of straight chain hydrocarbons therefrom are a wide boiling straight run naphtha, a heavy straight run naphtha, a light straight run naphtha, a catalytic cracked naphtha, a thermally cracked or thermally reformed naphtha, a catalytic reformed naphtha and the like.

The practice of this invention is applicable to any solid selective adsorbent which selectively adsorbs straight chain hydrocarbons to the substantial exclusion of non-straight chain hydrocarbons. This invention, however, is particularly applicable to a selective adsorbent comprising certain natural or synthetic zeolites or aluminosilicates, such as a calcium aluminosilicate, which exhibits the property of a molecular sieve, that is, matter made up of porous crystals wherein the pores of the crystals are of molecular dimension and are of substantially uniform size. In general, zeolites may be described as water-containing aluminosilicates having a general formula $(R,R_2')O \cdot Al_2O_3 \cdot nSiO_2 \cdot mH_2O$ wherein R may be an alkaline earth metal such as calcium, strontium or barium or even magnesium and wherein R' is an alkali metal such as sodium or potassium or lithium. Generally, these materials, when dehydrated for the removal of substantially all of the water therefrom, retain their crystalline structure and are particularly suitable as selective adsorbents.

A particularly suitable solid adsorbent for straight chain hydrocarbons is a calcium aluminosilicate, apparently actually a sodium calcium aluminosilicate, manufactured by Linde Air Products Company and designated Linde Type 5A Molecular Sieve. The crystals of this particular calcium aluminosilicate have a pore size or opening of about 5 Angstrom units, a pore size sufficiently large to admit straight chain hydrocarbons, such as the normal paraffins and the normal olefins, to the substantial exclusion of the non-straight chain hydrocarbons, i. e., naphthenic, aromatic, isoparaffinic and isoolefinic hydrocarbons. This particular selective adsorbent is available in various sizes, such as in the form of 1/8" or 1/16" diameter pellets, or as a finely divided powder having a particle size in the range of 0.5–5.0 microns. In general, a selective adsorbent employed in the practice of this invention may be in any suitable form or shape, granular, spheroidal or microspheroidal.

Particularly suitable solid selective adsorbents which may be employed in the practice of this invention include the synthetic and natural zeolites which, when dehydrated, may be described as crystalline zeolites having a rigid three dimensional anionic network and having interstitial dimensions sufficiently large to adsorb straight chain hydrocarbons but sufficiently small to exclude the non-straight chain hydrocarbons possessing larger molecular dimensions. The naturally occurring zeolite, chabazite, exhibits such desirable properties. Another suitable naturally occurring zeolite is analcite $NaAlSi_2O_6 \cdot H_2O$ which, when dehydrated, and when all or part of the sodium is replaced by an alkaline earth metal such as calcium by base exchange yields a material which may be represented by the formula $(Ca,Na_2)Al_2Si_4O_{12} \cdot 2H_2O$ and which, after suitable conditioning, will adsorb straight chain hydrocarbons to the substantial exclusion of non-straight chain hydrocarbons. Other naturally occurring or synthetically prepared zeolites such as phacolite, gmelinite, harmotome and the like, or suitable base exchange modifications of these zeolites, may also be employed in the practice of this invention.

Other solid inorganic or mineral selective adsorbents are known. It is contemplated that selective adsorbents having the property of selectively adsorbing straight chain hydrocarbons to the substantial exclusion of non-straight chain hydrocarbons in the manner of a molecular sieve may be obtained by suitable treatment of various oxide gels, especially metal oxide gels of the polyvalent amphoteric metal oxides, and may be suitably desorbed of their hydrocarbon content by the practice of this invention.

The adsorptive separation of the straight chain hydrocarbons from the hydrocarbon fraction undergoing treatment may be carried out in the liquid or gaseous phase and at any suitable temperature and pressure effective in the adsorptive separation operation. It is desirable, however, to coordinate the adsorptive separation conditions, e. g. temperature and pressure, with the desorptive separation conditions, more fully described hereinafter, so as to effect the most economical use of the materials employed and for ease of control.

The adsorptive separation or adsorption of the straight chain hydrocarbons by the solid selective adsorbent may be carried out at any suitable temperature, such as a temperature in the range 50–800° F., sufficient to effect the adsorptive separation of the desired straight chain hydrocarbons, and at any suitable pressure, such as a pressure in the range 0–10,000 p. s. i. g. and higher, the temperature and pressure being adjusted with respect to the hydrocarbon fraction undergoing treatment depending upon whether or not it is desired to maintain the hydrocarbon fraction undergoing separation in liquid phase or in the vapor or gaseous phase. Liquid phase adsorption may be carried out by simply slurrying the solid selective adsorbent with the liquid hydrocarbon fraction being treated, followed by separation or decantation of the treated hydrocarbon effluent, now substantially free of or having a reduced straight chain hydrocarbon content. Liquid phase adsorption may also be carried out by percolating the liquid hydrocarbon fraction to be treated through a bed of solid absorbent material. Heretofore it has been the usual practice, however, to carry out the adsorptive separation operation in the gaseous phase, that is to maintain the hydrocarbon fraction undergoing treatment in the vapor phase during the adsorption operation. In such an operation any suitable method for effecting gas-solid contact may be employed, for example, a fixed bed, a moving bed or a fluidized bed or a gas-entrained mass of selective adsorbent may be employed during the gas phase adsorptive separation operation. After sufficient time, the solid adsorbent is separated from the resulting treated hydrocarbon fraction, now having a reduced proportion of straight chain hydrocarbons, and the resulting separated solid adsorbent is then subsequently treated in accordance with the practice of this invention to desorb the hydrocarbon content therefrom.

The desorption of the adsorbed hydrocarbons (straight chain hydrocarbons) from the solid adsorbent material may be made at any suitable temperature and pressure. For example, the desorption operation may be carried out at a pressure in the range 0–10,000 p. s. i. g. In accordance with the practice of this invention, however, the desorption operation is carried out in the gaseous phase, that is, the gaseous desorbing fluid and the resulting desorbed hydrocarbons are both present in the resulting desorption effluent in the gaseous or vaporous phase. Accordingly the desorption temperature and the desorption pressure are adjusted to maintain the desorption fluid and the desorbed hydrocarbons in the gaseous phase. Generally a desorption pressure in the range 10–2,000 p. s. i. g. is suitable. It is sometimes desirable to carry out the desorption operation at a pressure substantially lower than the adsorption pressure. Isobaric adsorption-desorption operations are advantageous in some instances; however the pressure employed during the adsorptive separation operation is not determinative of the desorption pressure.

Generally any suitable desorption temperature sufficiently high to effect desorption of the adsorbed hydrocarbons may be employed in the practice of this invention. Usually a temperature in the range 400–1100° F. is employed during the desorption operation. It is generally preferred, however, to carry out the desorption operation at an elevated temperature in the range 700–1100° F. The desorption temperature employed, however, should not be excessively high, for example not greater than about 1100–1300° F., particularly in the instance wherein a material such as Linde Type 5A Molecular Sieve, that is, a calcium aluminosilicate, is employed as the selective adsorbent since these rather high temperatures are excessive and lead to the destruction of the adsorbent, presumably by collapse of the crystal structure, with resultant loss of the selective adsorption properties of this particular adsorbent.

As indicated hereinabove the gaseous desorbing fluid employed in the practice of this invention is preferably a material possessing a relatively high molar heat capacity, ($C_p$ or $C_v$) or a relatively high heat capacity per unit volume (gas phase), preferably a hydrocarbon containing at least 3 carbon atoms. The gaseous desorbing fluid may be any gaseous or vaporized hydrocarbon, straight chain or non-straight chain hydrocarbons. When a non-straight chain hydrocarbon is employed as the desorbing fluid for the desorption of the straight chain hydrocarbons, penetration of the crystal lattice or pores of the selective adsorbent is not obtained since generally non-straight chain hydrocarbons possess molecular dimensions (greater than about 5 Angstrom units) such that entry into the crystals of the selective adsorbent is precluded. Accordingly when a non-straight chain hydrocarbon is employed as a desorbing fluid the adsorbed straight chain hydrocarbons are not positively displaced from the adsorbent, but rather the desorbing fluid serves as a heat carrier to increase the temperature of the adsorbent so as to more readily permit the escape of the adsorbed straight chain hydrocarbons. When a non-straight chain hydrocarbon is employed as the desorbing fluid it is desirable that the desorption temperature be maintained above the critical temperature of the hydrocarbon adsorbed within the adsorbent possessing the highest critical temperature.

In the instance where a straight chain hydrocarbon is employed as the desorbing medium it is not only desirable that the desorption temperature be maintained above the critical temperature of the hydrocarbon adsorbed within the adsorbent possessing higher critical temperature but also above the critical temperature of the gaseous straight chain hydrocarbon employed in or as the desorbing medium. It is desirable to operate above the critical temperature in the instance of gaseous desorbing medium containing straight chain hydrocarbons because it has been found that the adsorptive capacity of the selective adsorbent for straight chain hydrocarbons is substantially reduced at a temperature at or above the critical temperature of the adsorbed straight chain hydrocarbon.

In accordance with a feature of this invention it is advantageous to employ as the gaseous desorbing medium a hydrocarbon which is readily separable, as by fractional distillation, from the adsorbed-desorbed hydrocarbons. For example, the instance where the selective adsorbent contains straight chain hydrocarbons in the molecular weight range $C_6$ and higher adsorbed therein, it is preferred to employ as the desorbing medium a hydrocarbon having a molecular weight in the range $C_3$–$C_5$, inclusive, such as propane, n-butane, isobutane, n-pentane, isopentane and neopentane or mixtures thereof, including their corresponding unsaturated hydrocarbons. Conversely in the instance where the selective adsorbent contains relatively low molecular weight straight chain hydrocarbons adsorbed therein, such as straight chain hydrocarbons in the molecular weight range $C_3$–$C_7$, it is advantageous to employ as the gaseous desorbing medium a hydrocarbon containing more than 7 carbon atoms per molecule, e. g., a hydrocarbon (straight chain and/or non-straight chain, or mixtures thereof) containing 8–12 or higher carbon atoms per molecule. Representative straight chain hydrocarbons and non-straight chain hydrocarbons which may be employed as a gaseous desorbing medium also include n-hexane, a branched chain hexane isomer, or a cyclic hydrocarbon containing six carbon atoms, n-heptane, a branched chain heptane isomer, or a cyclic hydrocarbon containing seven carbon atoms, n-octane, a branched chain octane isomer, or a cyclic hydrocarbon containing eight carbon atoms, and the like.

Illustrative of the practice of this invention a hydrocarbon fraction containing straight chain hydrocarbons and non-straight chain hydrocarbons such as a heavy straight run naphtha having an initial boiling point of about 200° F. and an end boiling point in the range 400–425° F. and containing 2–35% by volume straight chain hydrocarbons is subjected in the gaseous phase to contact with a solid particle form reforming or isomerization catalyst. Reforming catalysts are well known and comprise such materials as a platinum-containing catalyst, cobalt molybdate catalyst, so-called Hyperforming catalyst, a chromia-alumina catalyst which may be identified as Sovaforming or Thermofor Catalytic Reforming catalyst, a molybdena-alumina catalyst sometimes referred to as Hydroforming or Orthoforming catalyst, and the like. During the reforming operation the hydrocarbons being treated undergo substantially simultaneously a number of reactions including isomerization, dehydrogenation, aromatization or dehydrocyclization, cracking and the like depending upon the severity of the reforming conditions and the composition of the naphtha fraction. Generally catalytic reforming operations are carried out at a temperature in the range 750–1100° F. and at a pressure in the range 40–1,000 p. s. i. g., more or less, desirably in the presence of hydrogen. The severity of the reforming operation is dependent to some extent upon the composition of the naphtha fraction and the quality or composition of the catalytic reformate desired. During the reforming operation there is a net production of hydrogen (due to dehydrogenation of the hydrocarbons) together with production of relatively low molecular weight hydrocarbons such as $C_3$ and $C_4$ hydrocarbons, e. g., propane, n-butane and isobutane. The hydrogen is separated from the resulting reforming reaction effluent and recycled, at least in part, to the reforming reaction. The relatively low molecular weight hydrocarbons produced during the reforming reaction, especially the $C_4$ hydrocarbons, are also separated and are advantageously employed in accordance with the practice of this invention as more completely described hereinafter.

The resulting reaction effluent comprising catalytic reformate, after separation of hydrogen and a substantial amount of the relatively low molecular weight $C_4$ hydrocarbons therefrom, is contacted with a selective adsorbent for the removal of straight chain hydrocarbons therefrom. There issues a treated reformate effluent now substantially free of straight chain hydrocarbons or having a reduced straight chain hydrocarbon content, the straight chain hydrocarbons present in the catalytic reformate having been adsorbed by the selective adsorbent, such as Linde Type 5A Molecular Sieve. The straight chain hydrocarbons adsorbed in the selective adsorbent are comprised of normal hydrocarbons containing in the range 5–10, and higher, carbon atoms per molecule. These straight chain hydrocarbons are desorbed from the adsorbent by contacting the adsorbent with the $C_4$ hydrocarbon fraction previously separated at a temperature above about 307° F., the critical temperature of n-butane, preferably at a temperature above about 637° F., the critical temperature of n-decane, assuming n-decane possesses the highest critical temperature of those straight chain hydrocarbons contained adsorbed in the selective adsorbent. Higher or lower desorption temperatures may be employed depending upon the highest critical temperature of the hydrocarbons contained adsorbed within the adsorbent. In any instance it is desirable to maintain the desorption temperature above the highest critical temperature of the straight chain hydrocarbons employed in the desorbing medium. Typical critical temperatures for representative straight chain and non-straight chain hydrocarbons are as follows, see also Physical Constants of the Principal Hydrocarbons, fourth edition, by M. P. Doss, published 1943, New York, New York, by The Texas Company.

| Hydrocarbons: | Critical temperature, ° F. |
|---|---|
| Propylene | 196 |
| Propane | 206 |
| Cyclopropane | 256 |
| n-Butane | 307 |
| n-Pentane | 386 |
| n-Hexane | 453 |
| n-Heptane | 512 |
| n-Octane | 572 |
| n-Nonane | 611 |
| n-Decane | 637 |
| n-Undecane | 642 |
| n-Dodecane | 735 |
| n-Tridecane | 770 |
| n-Tetradecane | 800 |
| n-Pentadecane | 832 |

If desired, the above-described heavy straight run fraction may first be subjected to contact with the selective adsorbent, followed by catalytic reforming of the resulting treated effluent, now having a reduced straight chain hydrocarbon content. The $C_4$ hydrocarbon fraction produced during the catalytic reforming operation is then separated, recovered and employed in accordance with the practice of this invention to desorb the straight chain hydrocarbon (in the molecular weight range $C_7$–$C_{12}$ and higher) from the selective adsorbent.

As will be apparent to those skilled in the art many modifications, substitutions and changes are possible without departing from the spirit or scope of this invention.

We claim:

1. A method of desorbing straight chain hydrocarbons from a selective adsorbent which contains straight chain hydrocarbons adsorbed therein to the substantial exclusion of non-straight chain hydrocarbons which comprises contacting said adsorbent with a gaseous hydrocarbon containing at least 3 carbon atoms per molecule at an elevated temperature sufficiently high to effect desorption of said straight chain hydrocarbons from said adsorbent, said elevated temperature being above the critical temperature of said gaseous hydrocarbon.

2. A method of desorbing straight chain hydrocarbons from a selective adsorbent which contains straight chain hydrocarbons adsorbed therein to the substantial exclusion of non-straight chain hydrocarbons which comprises contacting said adsorbent with a gaseous hydrocarbon containing at least 3 carbon atoms per molecule and having a boiling point as compared to the straight chain hydrocarbons contained adsorbed with said selective adsorbent so as to be readily separable therefrom by fractional distillation, at an elevated temperature so as to effect desorption of said adsorbed straight chain hydrocarbons from said selective absorbent, said elevated temperature being above the critical temperature of said gaseous hydrocarbon.

3. A method of desorbing straight chain hydrocarbons from a selective adsorbent which contains straight chain hydrocarbons adsorbed therein to the substantial exclusion of non-straight chain hydrocarbons which comprises contacting said adsorbent with a gaseous non-straight chain hydrocarbon at an elevated temperature sufficiently high to desorb the straight chain hydrocarbons from said adsorbent, said elevated temperature being above the critical temperature of said gaseous hydrocarbon.

4. A method of desorbing straight chain hydrocarbons from a selective adsorbent which contains straight chain hydrocarbons adsorbed therein to the substantial exclusion of non-straight chain hydrocarbons which comprises contacting said adsorbent with a gaseous non-straight chain hydrocarbon at an elevated temperature sufficiently high to desorb the straight chain hydrocarbons from said adsorbent, said non-straight chain hydrocarbon having a boiling point substantially different from the desorbed straight chain hydrocarbons so as to be readily separable therefrom by fractional distillation, and said elevated temperature being above the critical temperature of said gaseous hydrocarbon.

5. A method of desorbing straight chain hydrocarbons from a selective adsorbent containing straight chain hydrocarbons adsorbed therein to the substantial exclusion of non-straight chain hydrocarbons which comprises contacting said adsorbent with a gaseous hydrocarbon containing at least 3 carbon atoms per molecule at an elevated temperature above the critical temperature of the straight chain hydrocarbon adsorbed within said adsorbent possessing the highest critical temperature so as to effect substantially complete desorption of said straight chain hydrocarbons from said adsorbent, said elevated temperature being above the critical temperature of said gaseous hydrocarbon.

6. A method of desorbing straight chain hydrocarbons from a selective adsorbent containing straight chain hydrocarbons adsorbed therein which comprises contacting said adsorbent with a gaseous non-straight chain hydrocarbon at an elevated temperature above the critical temperature of the straight chain hyrocarbon adsorbed within said adsorbent possessing the highest critical temperature so as to effect substantially complete desorption of said straight chain hydrocarbons from said adsorbent, said elevated temperature being above the critical temperature of said gaseous hydrocarbon.

7. A method in accordance with claim 6 wherein said gaseous stream comprises isobutane.

8. A method of desorbing straight chain hydrocarbons from a selective adsorbent containing straight chain hydrocarbons adsorbed therein to the substantial exclusion of non-straight chain hydrocarbons which comprises contacting said adsorbent with a gaseous straight chain hydrocarbon containing at least 3 carbon atoms per molecule at a temperature T, said temperature T being above the critical temperature of said gaseous straight chain hydrocarbon and above the critical temperature of the straight chain hydrocarbon adsorbed in said adsorbent possessing the highest critical temperature, to effect desorption of said straight chain hydrocarbons from said adsorbent.

9. A method in accordance with claim 8 wherein said straight chain hydrocarbon is n-butane.

10. A method in accordance with claim 8 wherein said straight chain hydrocarbon is n-pentane.

11. A method in accordance with claim 8 wherein said straight chain hydrocarbon is n-hexane.

12. A method in accordance with claim 8 wherein said straight chain hydrocarbon is n-heptane.

13. A method of desorbing straight chain hydrocarbons from a selective adsorbent which contains straight chain hydrocarbons in the molecular weight range $C_5$–$C_{10}$ adsorbed therein which comprises contacting said adsorbent with a straight chain hydrocarbon containing at least 3 carbon atoms per molecule at a temperature above about the critical temperature of the straight chain hydrocarbon adsorbed in said adsorbent possessing the highest critical temperature to effect desorption of the straight chain hydrocarbons from said adsorbent.

14. A method of desorbing straight chain hydrocarbons from a selective adsorbent containing straight chain hydrocarbons adsorbed therein which comprises contacting said adsorbent with a gaseous hydrocarbon selected from the group consisting of $C_3$–$C_5$, inclusive, hydrocarbons at a temperature above the critical temperature of said gaseous hydrocarbon so as to effect desorption of the straight chain hydrocarbons from said adsorbent.

15. A combination hydrocarbon treating operation which comprises subjecting a hydrocarbon fraction in the naphtha boiling range and containing straight chain hydrocarbons and non-straight chain hydrocarbons to catalytic reforming with the resulting production of a catalytic reformate having an increased proportion of non-straight chain hydrocarbons, contacting said catalytic reformate with a selective adsorbent which selectively adsorbs straight chain hydrocarbons to the substantial exclusion of non-straight chain hydrocarbons to adsorb straight chain hydrocarbons therefrom with the resulting production of a treated reformate having a reduced proportion of straight chain hydrocarbons therein, and contacting said adsorbent now containing straight chain hydrocarbons adsorbed therein with a gaseous hydrocarbon containing at least 3 carbon atoms per molecule at a temperature above about the critical temperature of the straight chain hydrocarbon adsorbed therein possessing the highest critical temperature so as to effect the desorption of said straight chain hydrocarbons from said adsorbent.

16. A method in accordance with claim 15 wherein said desorbed straight chain hydrocarbons are recovered and are employed as said gaseous hydrocarbon so as to effect desorption of the straight chain hydrocarbons from said adsorbent.

17. A combination process for treating a hydrocarbon fraction in the naphtha boiling range containing straight chain hydrocarbons and non-straight chain hydrocarbons which comprises catalytically reforming said hydrocarbon fraction with the resulting production of a catalytic reformate having an increased proportion of non-straight chain hydrocarbons, contacting said catalytic reformate with a selective adsorbent which selectively adsorbs straight chain hydrocarbons to the substantial exclusion of non-straight chain hydrocarbons to effect adsorption of said straight chain hydrocarbons therefrom and the resulting production of a treated reformate having a reduced proportion of straight chain hydrocarbons relative to said catalytic reformate, and contacting the adsorbent, now containing straight chain hydrocarbons adsorbed therein, with a gaseous hydrocarbon containing at least 3 carbon atoms per molecule at a temperature sufficiently high to effect substantially complete desorption of the adsorbed straight chain hydrocarbons, said gaseous hydrocarbon having a boiling point relative to the adsorbed straight chain hydrocarbons contained within said adsorbent so as to be readily separable therefrom by fractional distillation.

18. A method in accordance with claim 17 wherein said gaseous hydrocarbon is a hydrocarbon having a molecular weight in the range $C_3$–$C_5$.

19. A method in accordance with claim 2 wherein said gaseous hydrocarbon is a $C_4$ hydrocarbon.

20. A method of desorbing straight chain hydrocarbons from a selective adsorbent which contains straight chain hydrocarbons adsorbed therein which comprises contacting said adsorbent with gaseous isobutane at an elevated temperature sufficiently high to effect desorption of said straight chain hydrocarbons from said adsorbent, said elevated temperature being above the critical temperature of isobutane.

21. A method of desorbing straight chain hydrocarbons from a selective adsorbent containing straight chain hydrocarbons adsorbed therein which comprises contacting said adsorbent with a gaseous straight chain hydrocarbon selected from the group consisting of straight chain hydrocarbons having from 3 to 5, inclusive, carbon atoms per molecule at an elevated temperature sufficient to effect substantially complete desorption of the straight chain hydrocarbons adsorbed in said adsorbent, said elevated temperature being above the critical temperature of said gaseous straight chain hydrocarbon and above about the critical temperature of the straight chain hydrocarbon adsorbed in said adsorbent possessing the highest critical temperature.

22. A combination treating process for treating a hydrocarbon fraction containing straight chain hydrocarbons and non-straight chain hydrocarbons which comprises contacting said fraction with a selective adsorbent which selectively adsorbs straight chain hydrocarbons to the substantial exclusion of non-straight chain hydrocarbons to adsorb straight chain hydrocarbons from said fraction with the resulting production of a treated effluent having a reduced proportion of straight chain hydrocarbons relative to said hydrocarbon fraction, subjecting the resulting treated effluent to catalytic reforming with the resulting production of a catalytic reformate having improved properties as a motor fuel component together with the production of a relatively low molecular weight hydrocarbon fraction comprising $C_4$ hydrocarbons, separating $C_4$ hydrocarbons from said low molecular weight fraction and contacting said adsorbent with said $C_4$ hydrocarbon in the gaseous phase at an elevated temperature above about the critical temperature of the hydrocarbon contained in said adsorbent possessing the highest critical temperature so as to effect substantially complete removal of the straight chain hydrocarbons therefrom.

23. A process in accordance with claim 22 wherein said $C_4$ hydrocarbons are recovered from the resulting desorption effluent.

References Cited in the file of this patent

UNITED STATES PATENTS

| | | |
|---|---|---|
| 2,415,315 | Walter et al. | Feb. 4, 1947 |
| 2,425,535 | Hibshman | Aug. 12, 1947 |
| 2,449,402 | Lipkin et al. | Sept. 14, 1948 |
| 2,459,442 | Lipkin | Jan. 18, 1949 |
| 2,493,911 | Brandt | Jan. 10, 1950 |
| 2,566,613 | Hepp | Sept. 4, 1951 |
| 2,586,889 | Vesterdal et al. | Feb. 26, 1952 |
| 2,653,175 | Davis | Sept. 22, 1953 |
| 2,702,286 | Kirshenbaum et al. | Feb. 22, 1955 |